Sept. 21, 1971   J. SIMPSON ET AL   3,606,980

MODIFIED BUTTERFLY TRIP VALVE

Filed Dec. 1, 1969

3,606,980
MODIFIED BUTTERFLY TRIP VALVE
James Simpson and Wesley F. Reeder, Hamilton, Ontario,
Canada, assignors to Canadian Westinghouse Company Limited, Hamilton, Ontario, Canada
Filed Dec. 1, 1969, Ser. No. 881,245
Claims priority, application Canada, Dec. 11, 1968, 37,482
Int. Cl. F16k 31/44, 1/22
U.S. Cl. 251—66    3 Claims

ABSTRACT OF THE DISCLOSURE

The invention is a butterfly valve for use in turbine emergency shutdown. Conventional butterfly valves would jam at the temperatures and pressures involved. This valve is arranged to remain partially open in the shut-off position, the valve disc is slidable on the valve shaft to prevent galling with the valve passage and the disc is relieved adjacent the shaft bushings. These features, combined with an anti-thrust bearing for the shaft ensure reliable operation.

BACKGROUND OF THE INVENTION

This invention relates to an improved butterfly valve, particularly for the control of fluids at elevated temperatures or under high pressures.

A typical application for the type of valve to which the present invention relates is in the control of steam supply to a turbine. It is necessary to provide some means of stopping a turbine in an emergency, and this is often accomplished by means of a valve in the steam supply conduit. For such a valve to be effective, it must close properly and to such an extent as to reduce the flow of steam sufficiently to allow the turbine to come to rest. It must also be capable of being reset to the open position. Conventional manually operated butterfly valves generally possess the aforementioned properties only up to approximately 150 p.s.i.g. Between approximately 150 and 400 p.s.i.g. their operation is unpredictable, and above 400 p.s.i.g. such valves tend to become inoperative. These deficiencies are a result of various factors arising from the high temperatures and pressures associated with turbine equipment, and representative of such factors are the following. The high temperature of the steam passing through the valve causes a differential thermal expansion between the valve bushings and valve disc thus reducing the clearance therebetween necessary for free rotation of the disc. The high pressures involved contribute to a number of factors, for instance, the upward force from the steam accumulated beneath the lower bushing by leakage through the clearance thereof is opposed by the edge of the valve disc acting against the top of the valve bore. Also, when partial closure occurs, the increase in pressure differential between inlet and outlet sides of the valve disc causes an increase in force perpendicular to the shaft which is opposed by the valve bushings. Thus, friction is increased and further closing prevented. Pressure of the fluid also causes partial opening of the valve disc when the disc is in its fully closed position, the disc is in its fully closed position, the trailing edge of the valve disc being forced away from sealing contact with the bore, and the leading edge being wedged against the bore. This latter feature causes both leakage of steam past the disc and also sticking of the valve in its closed position.

The purpose of the present invention is to provide a butterfly valve which does not suffer from the aforementioned disadvantages and is effective in the control of fluids at elevated temperatures and under high pressures.

SUMMARY OF THE INVENTION

Thus according to the present invention, there is provided a butterfly valve comprising a valve bore, a valve disc journalled in said bore for rotation about an axis extending transversely thereof to control passage of fluid through said bore, said disc being located upon a control shaft in such manner as to be rotationally keyed and longitudinally slidable relationship thereto.

In a preferred embodiment of the invention, bushings are provided in the valve body to accommodate the control shaft passing therethrough, and the valve disc is relieved at its perimeter adjacent said bushings in such manner as to compensate for the differential thermal expansion between the valve disc and bushings during contact with heated fluid within the valve bore.

In yet a further embodiment of the invention, partial opening of the valve disc when in its closed position is minimized by orienting the disc with its plane substantially at right angles to the longitudinal axis of the valve bore.

In yet a further embodiment of the invention, stop means are provided to limit closure of the valve disc to a position where substantially full restriction of fluid passage within the valve bore is effected without wedging of the valve disc within said bore.

BRIEF DESCRIPTION OF THE DRAWINGS

Various other embodiments of the invention will become apparent from the following examples which are by way of illustration only and are with reference to the accompanying drawings, in which.

Figure 1:
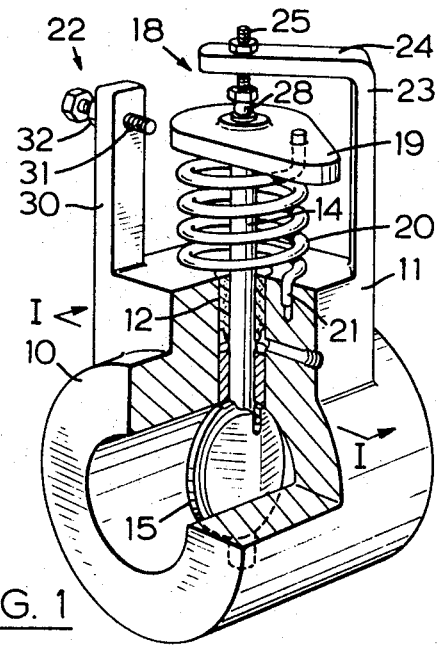
FIG. 1 is a perspective view of a butterfly valve according to the present invention.
Figure 2:
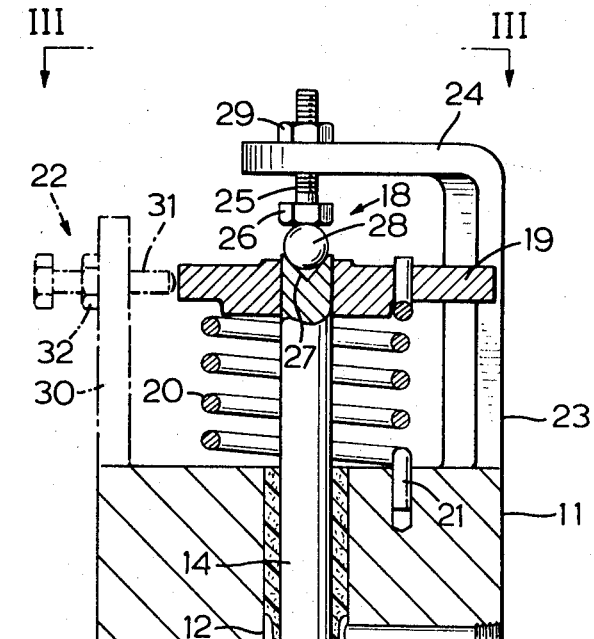
FIG. 2 is a cross-sectional view on the line I of FIG. 1.

Referring now to the drawings, and particularly to FIGS. 1 and 2, a butterfly valve according to the present invention comprises a body 10 provided with perimetrical extension 11 thereto. A hole 12 is provided radially of the valve body and extending from the outer surface of the extension 11 to the valve bore. A second hole 13 is bored through the valve body, such hole being diametrically opposed to the hole 12. The holes 12 and 13 accommodate a valve control shaft 14, upon which is mounted a disc 15 within the valve bore. The shaft is rotatably supported within the hole 12 by bushing 16, and within the hole 13 by means of a bearing 17. The control shaft extends from the extension 11 by about a quarter of its total length, and terminates in a bearing assembly designated generally at 18. A quadrant 19 is rigidly located upon the shaft adjacent the assembly 18, and between the quadrant and the upper surface of the extension 11 there is provided a torsion spring 20, coaxial with and surrounding the shaft 14. The lower extremity of the spring is attached to the extension 11 at the point 21, and the upper extremity is similarly attached to the quadrant 19. Rotation of the quadrant under the influence of the spring 20 is limited by stop means designated generally at 22 and against which the lobe of the quadrant abuts.

The bearing assembly 18 comprises a post 23 extending from the upper surface of the extension 11 and terminating in a turned-over portion 24. The portion 24 has a hard-head screw 25 passing therethrough, said screw being in axial alignment with the control shaft 14, and with its head 26 adjacent the end of said shaft. The shaft end is provided with a hollow 27 adapted to accommodate and support a ball 28. The screw 25 is positioned so that its head 26 just touches the ball 18, without exerting pressure thereupon. This position of the screw is secured by means of the lock nut 29.

Figure 4:
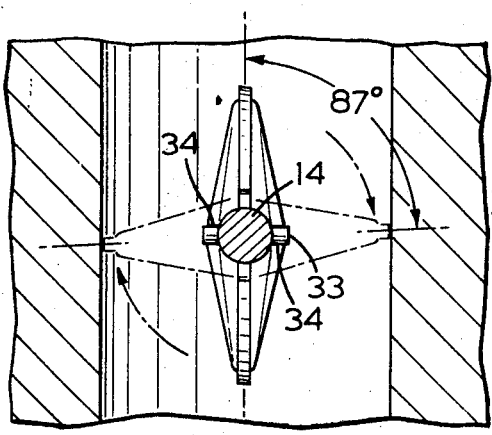
FIG. 4 is a section on the line II—II of FIG. 2.
Figure 3:
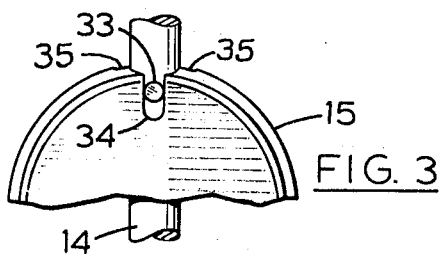
FIG. 3 is a perspective view of the upper portion of the valve disc employed in the butterfly valve of the present invention.

The stop means 22 comprises a post 30 extending vertically from the upper surface of the extension 11, and the lobe of the quadrant 19 abuts against an adjustable stop screw 31 passing through the upper portion of the post 30. The screw 31 is held in its desired position by means of the lock nut 32. For a detailed description of the valve disc 15 and its method of connection to the shaft 14, reference is particularly made to FIGS. 3 and 4. The disc is formed with a diametrically extending cylindrical bore therethrough. The bore is of such radius as to freely accommodate the shaft 14. The shaft is provided with a pin 33 passing diametrically therethrough and journalled at each end within a slot 34 formed at each side of the valve disc. Each slot extends in a direction parallel to the axis of the shaft 14, and thereby permits longitudinal movement of the shaft relative to the disc 15 whilst preventing relative rotational movement between the shaft and disc. The disc is relieved at the four points (two of which are shown as relief areas 35) upon its perimeter immediately adjacent the shaft 14 in order to compensate for differential expansion between the valve disc and the bushings 16 and 17.

Figure 5:
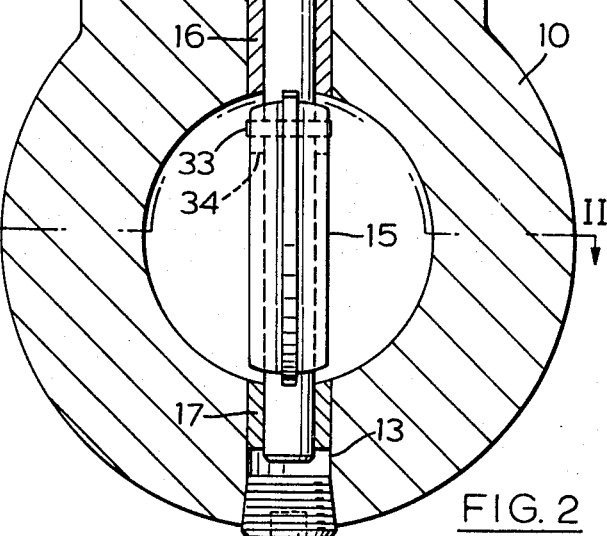
FIG. 5 is a view in the direction III of FIG. 2.
Figure 5:
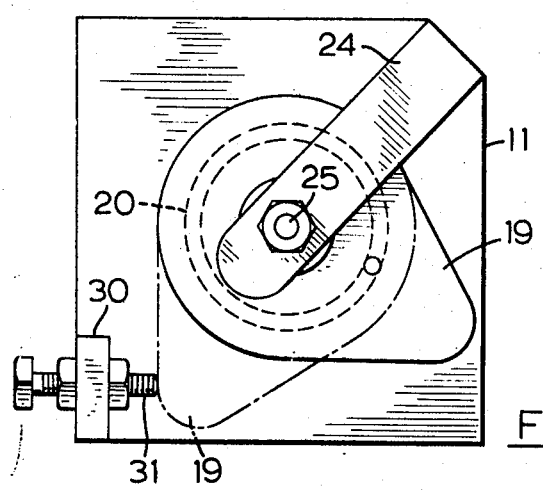

In operation, the valve is normally set in its open position, whereupon the quadrant 19 is as shown in FIG. 5. The valve is held in its open position by conventional trip means (not shown) and against the tension of the spring 20. When the trip means are actuated (for example by a device indicating emergency shutdown of the turbine), the quadrant 19 rotates into the position shown in broken lines in FIG. 5. It has been found that the optimum position for the valve disc in its closed position is at an angle of approximately 87 degrees from the longitudinal axis of the valve bore. By selection of this angle and appropriate chamfering of the edges of the valve disc, it has been found that substantially complete closure of the valve bore may be effected without the tendency for the disc to wedge within the bore and partially open. Setting of the closure angle of the disc is effected by means of the screw 31, which is adjusted in such manner as to abut and thereby restrict rotation of the quadrant 19 when the disc is in the desired closed position.

It has further been found that freedom of axial movement of the shaft relative to the disc prevents sticking of the disc due to the upward force from the steam passing through the clearance of the bushing 17 and accumulating thereunder being opposed by the edge of the valve disc acting upon the top of the valve bore. In the present invention, the upward thrust from the steam is taken by the bearing assembly 18 rather than by the upper edges of the valve disc. Similarly, pressure of the spring 20 axially of the shaft, tending to cause galling between the disc and bushings, when the shaft and disc are axially fixed is taken by the bearing.

The valve disc, having a closure angle of almost 90 degrees to the axis of the valve bore, has minimal turning moment due to the steam pressure thereupon, and the tendency for the valve to leak or wedge in the closed position is therefore negligible.

The spring 20 is preferably constructed of, for example, stainless steel, which does not show great loss of spring torque with time and extended high temperature operation.

The embodiments of the invention in which an exclusive property or privilege is claimed are defined as follows:

1. A butterfly valve device comprising a valve body having a first bore extending therethrough, a second bore extending at right angles through the axis of said first bore, said second bore being of such diameter as to receive a pair of suitable bushing members on opposite sides of said first bore in frictional engagement therein, said bushings receiving a valve control shaft in pivotal engagement therein, said shaft having a control disc mounted thereon so as to be rotationally keyed and longitudinally slidable on said control shaft in said first bore so as to control the passage of fluid in said first bore by suitable rotation of said disc on said control shaft, said valve disc being slightly flattened in peripheral areas adjacent said bushings to provide relief for said disc and to compensate for a differential thermal expansion between the valve disc and the bushing members upon the passage of heated fluid through said first bore.

2. A butterfly valve device as claimed in claim 1 wherein one end of the control shaft has a conically shaped recess provided therein, such that the axis of the conical recess coincides with the axis of said shaft, a spherical bearing member being held captive in said recess by a suitable stop member formed on said valve body.

3. A butterfly valve device as claimed in claim 1 wherein said shaft is urged in an axial direction by a torsion spring to ward a stop formed in the body of said valve device, said shaft having a conical recess formed in the end thereof adjacent said stop, a spherical bearing member held captive in said recess by the action of said torsion spring urging said shaft toward said stop.

References Cited

UNITED STATES PATENTS

| 1,034,009 | 7/1912  | Gillen         | 251—66X  |
| --------- | ------- | -------------- | -------- |
| 1,910,744 | 5/1933  | Brinkmann et al. | 251—68 |
| 2,027,978 | 1/1936  | Hoff           | 251—306  |
| 2,449,604 | 9/1948  | Jackson        | 251—74   |
| 2,857,926 | 10/1958 | Rundquist      | 251—305X |
| 2,924,424 | 2/1960  | Titterington   | 251—305  |
| 3,192,945 | 7/1965  | Blakeley       | 251—308X |
| 3,275,034 | 9/1966  | Tadlock        | 251—68X  |

FOREIGN PATENTS

| 1,300,519 | 6/1962 | France | 251—306 |
| --- | --- | --- | --- |

HENRY T. KLINKSIEK, Primary Examiner

U.S. Cl. X.R.

251—84, 305